United States Patent
Jung et al.

(10) Patent No.: US 10,051,283 B2
(45) Date of Patent: Aug. 14, 2018

(54) PREDICTION OF A MOVEMENT VECTOR OF A CURRENT IMAGE PARTITION HAVING A DIFFERENT GEOMETRIC SHAPE OR SIZE FROM THAT OF AT LEAST ONE ADJACENT REFERENCE IMAGE PARTITION AND ENCODING AND DECODING USING ONE SUCH PREDICTION

(75) Inventors: Joel Jung, Le Mesnil Saint-Denis (FR); Guillaume Laroche, Rennes (FR); Jean Marc Thiesse, Paris (FR)

(73) Assignee: FRANCE TELECOM, Paris (FR)

( * ) Notice: Subject to any disclaimer, the term of this patent is extended or adjusted under 35 U.S.C. 154(b) by 520 days.

(21) Appl. No.: 13/381,072

(22) PCT Filed: Jun. 25, 2010

(86) PCT No.: PCT/FR2010/051306
§ 371 (c)(1),
(2), (4) Date: Dec. 27, 2011

(87) PCT Pub. No.: WO2011/001078
PCT Pub. Date: Jan. 6, 2011

(65) Prior Publication Data
US 2012/0106647 A1     May 3, 2012

(30) Foreign Application Priority Data
Jul. 3, 2009 (FR) .................................. 09 54624

(51) Int. Cl.
*H04N 7/32*     (2006.01)
*H04N 19/57*     (2014.01)
*H04N 19/52*     (2014.01)

(52) U.S. Cl.
CPC ............. *H04N 19/57* (2014.11); *H04N 19/52* (2014.11)

(58) Field of Classification Search
CPC ...... H04N 7/50; H04N 5/145; H04N 7/26765; H04N 7/26244; H04N 7/361
USPC ......................................... 375/240.16
See application file for complete search history.

(56) References Cited

U.S. PATENT DOCUMENTS 5,978,048 A * 11/1999 Lee .................. H04N 5/145
348/699
2003/0156651 A1* 8/2003 Streater et al. .......... 375/240.25
(Continued)

OTHER PUBLICATIONS

ITU-T Recommendation H.264, Series H: Audiovisual and Multimedia Systems Infrastructure of audiovisual services—Coding of moving video. "Advanced video coding for generic audiovisual services." Mar. 2005, pp. 1-343.
(Continued)

*Primary Examiner* — On S Mung
(74) *Attorney, Agent, or Firm* — Haverstock & Owens LLP

(57) ABSTRACT

The invention relates to a method for predicting a movement vector (MVp1) of a partition (P1) of a current image ($I_N$) from a plurality of n reference movement vectors associated respectively with n reference partitions that have been previously encoded and decoded. For a spatial prediction of one such vector, when the geometric shape of the current partition is different from that of k adjacent reference partitions (pr1, pr2, ... prk), with k≤n, the movement vector of the current image partition is determined from a function of at least one reference movement vector belonging to a set of k reference movement vectors associated respectively with k adjacent reference partitions.

15 Claims, 6 Drawing Sheets

(56) References Cited

U.S. PATENT DOCUMENTS

| | | | |
|---|---|---|---|
| 2004/0028282 A1* | 2/2004 | Kato et al. | 382/236 |
| 2005/0100095 A1* | 5/2005 | Itoh et al. | 375/240.16 |
| 2006/0262861 A1* | 11/2006 | Kobayashi | 375/240.24 |
| 2008/0063068 A1* | 3/2008 | Sekiguchi et al. | 375/240.16 |
| 2008/0159401 A1 | 7/2008 | Lee et al. | |
| 2008/0247465 A1 | 10/2008 | Xin et al. | |
| 2009/0196342 A1* | 8/2009 | Divorra Escoda et al. | 375/240.02 |
| 2010/0208827 A1* | 8/2010 | Divorra Escoda ... H04N 19/176 | 375/240.24 |

OTHER PUBLICATIONS

ITU—Telecommunications Standardization Sector, Study Group 16, Question 6, Video Coding Experts Group (VCEG). 34th Meeting, Antalya, Turkey, Jan. 12-13, 2008, pp. 1-8, entitled "New Macroblock Bipartioning Modes for Inter Coding".
Sullivan et al., "Rate-Distortion Optimization for Video Compression", IEEE Signal Processing Magazine, Nov. 1998, pp. 74-90.
Dai et al., "Geometry-Adaptive Block Partitioning for Intra Prediction in Image & Video Coding", IEEE, 2007, pp. VI-85 through VI-88.
"Next Generation Digital Video Compression Technology H.264/MPEG-4 Part 10 AVC Baseline Decoder", www.globaledgesoft.com, XP-002561948, pp. 1-12.
Guillaume Laroche, "RD Optimized Coding for Motion Vector Predictor Selection", IEEE Transactions on Circuits and System for Video Technology, vol. 18, No. 12, Dec. 2008, pp. 1681-1691.
Dragos Ruiu, "An Overview of MPEG-2, The 1997 Digital Video Test Symposium", Hewlett Packard, 1997.
Ralf Schafer, Thomas Wiegand and Heiko Swarz, "The emerging H.264/AVC standard", EBU Technical Review, Jan. 2003.

\* cited by examiner

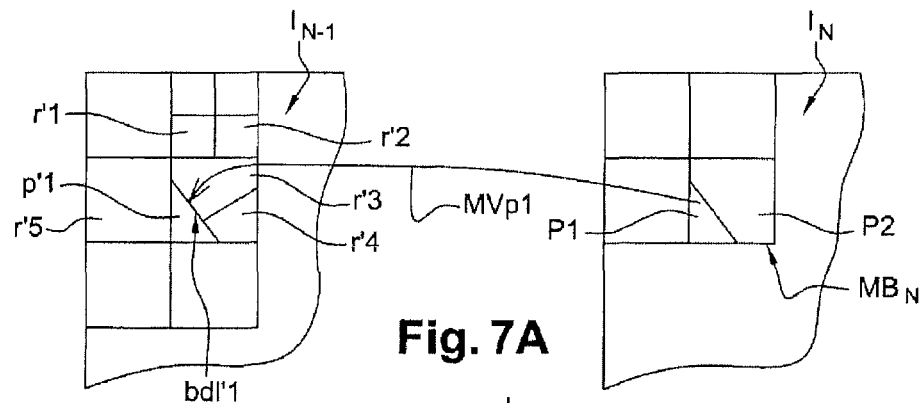
Fig. 7A
Fig. 7B
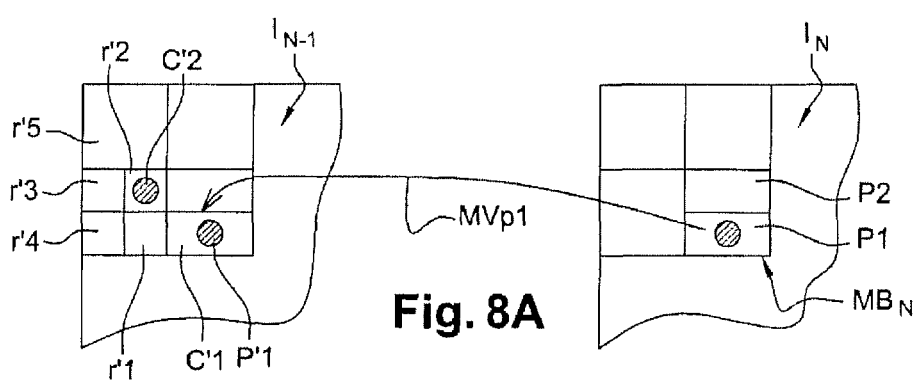
Fig. 8A
Fig. 8B

US 10,051,283 B2

PREDICTION OF A MOVEMENT VECTOR OF A CURRENT IMAGE PARTITION HAVING A DIFFERENT GEOMETRIC SHAPE OR SIZE FROM THAT OF AT LEAST ONE ADJACENT REFERENCE IMAGE PARTITION AND ENCODING AND DECODING USING ONE SUCH PREDICTION

BACKGROUND OF THE INVENTION

The present invention pertains generally to the field of image processing, and more precisely to the competition-based coding and decoding of digital images and of digital image sequences.

Several coding and decoding methods exist for the transmission of images. Among the principal types of coding are in particular those such as so-called "intra" coding where an image is coded in an autonomous manner, that is to say without reference to other images, or else so-called "inter" coding which consists in coding a current image with respect to past images so as to express the difference between these images and transmit only this difference.

The methods for coding of the aforementioned type generally comprise a step of predictive coding according to which portions of images, called blocks or macroblocks, of a current image are predicted with respect to other reference blocks or macroblocks, that is to say previously coded and then decoded.

In the case for example of the H264/MPEG-4 AVC (standing for "Advanced Video Coding") standard, the predictive coding of a macroblock consists in splitting the macroblocks according to a plurality of partitions generally having the shape of blocks of smaller size.

More precisely in the case of the inter coding in accordance with the aforementioned standard, the current macroblock to be coded may be partitioned according to the 16×16, 8×16, 16×8 and 8×8 modes. If the 8×8 mode is selected, each 8×8 block is again partitioned according to the 8×8, 4×8, 8×4 and 4×4 modes. Each current block is compared with one or more blocks respectively of one or more reference images. A motion vector is then obtained which describes the motion between the current block and the reference block having the same position as the current macroblock in the previous image. A predictor of this motion vector is then calculated so as to code the residual between the aforementioned motion vector and the calculated predictor motion vector.

Such a prediction of the motion vector is not suited to all the types of partitioning.

FIG. 1A represents for example the case of a temporal prediction of a motion vector MVp1 of a partition P1 of a current macroblock to be coded, denoted $MBC_N$, which belongs to an image N to be coded in accordance with the aforementioned standard. In the example represented, such a macroblock $MBC_N$ is of conventional square shape. The partition P1, of smaller size than that of the current macroblock $MBC_N$, also has a square shape. The partition P1 is moreover surrounded by other macroblocks BR1, BR2, BR3, BR4 which are situated in its close neighborhood and which, in the example represented, have the same shape and size as those of the macroblock $MBC_N$.

In the example represented, the motion vector MVp1 points at a zone p'1 of a reference image, denoted N−1, which is for example the immediately previous image. The reference image zone p'1 has the same position as the partition p1 of the current macroblock $MBC_N$ in the previous image N−1 and neighbors a plurality of reference partitions r'1, r'2, r'3 and r'4.

In application of the H264/AVC standard, the aforementioned motion vector MVp1 is predicted spatially only. More precisely, the calculation is undertaken of a reference motion vector which is equal to a median of the motion vectors MV1, MV3, MV4, associated respectively with the reference macroblocks BR1, BR3, BR4.

Moreover, new types of partitioning of the current macroblock to be coded have recently appeared, which had not been provided for in the H264/AVC standard. Thus, as represented in FIG. 1B, a current macroblock to be coded $MBC_N$ may be split up into several partitions P1 to Pp of linear shape, L-shaped, or else of entirely arbitrary shape.

The H264/AVC standard does not provide for any motion vector prediction which is suited to the various types of partitioning of FIG. 1B and to the particular case where the reference image zone pointed at by this vector has a geometric shape or a size different respectively from the geometric shape or else from the size of at least one neighbor reference partition.

Such a situation is represented in FIG. 1C which illustrates the case of a prediction of several motion vectors MVp1, MVp2, MVp3 associated respectively with three partitions P1, P2, P3 of a current macroblock to be coded $MBC_N$ belonging to an image N to be coded in accordance with the aforementioned standard. In the example represented, the partitions P1, P2 and P3 of the macroblock $MBC_N$ are of arbitrary geometric shape.

In the example represented, the motion vector of the first partition P1 of the current macroblock $MBC_N$, denoted MVp1, points at a reference image zone p'1 of a reference macroblock $MBC_{N-1}$ of a reference image N−1 having the same position as the current macroblock $MBC_N$ in the previous image N−1. A reference partition r'1, neighboring the reference image zone p'1, has a very different geometric shape from that of the reference image zone p'1 and the H264/AVC standard does not propose a calculation scheme specific to a typical case such as this.

In application of the H264/AVC standard, to predict for example the motion vector Mvp1, the calculation is undertaken, as in the case of FIG. 1A, of a reference motion vector which is generally equal to a spatial median of the motion vectors MV1, M3, MV4, associated respectively with the reference macroblocks BR1, BR3, BR4 of the current image N.

Such a spatial prediction of the motion vector may turn out to lack precision having regard to the fact that in the image N−1, there exists a difference in shape and in size between the reference image zone p'1 and the reference partitions r'1, r'2, r'3, r'4.

FIG. 1D represents for example the case of a spatial prediction of a motion vector MVp1 of a partition P1 of a current macroblock to be coded, denoted $MBC_N$, which belongs to an image N to be coded in accordance with the aforementioned standard. The conventional prediction scheme used in the H264/AVC standard consists in calculating the motion vector MVp1 of the partition P1 in the guise of median of the reference motion vectors associated respectively with the neighbor reference partitions of the partition P1, namely the partitions BR1, BR3 and BR4 in FIG. 1D.

Now, it should be noted that apart from the partition r'5 arranged just above the partition P1, the other reference partitions BR1, BR2, just like the reference sub-partitions r'1, r'2, r'3 of BR3 and r'4 of BR4, have a geometric shape or a size very different from that of the partition P1. Thus, in a manner analogous to FIG. 1C, the conventional prediction scheme will not therefore be suited to the particular partitioning illustrated in FIG. 1D. Indeed, such a scheme does not impose any rules for selecting the most suitable reference partitions in terms of geometric shape or size, and therefore corresponding reference motion vectors for the prediction of MVp1.

Other schemes for calculating the reference motion vector with a view to Inter-coding the partitions of a current macroblock are moreover known.

One of them is described in the publication *IEEE Transactions on Circuits and System for Video Technology*, Vol. 18, 1247-1257 (September 2008), by G Laroche, J. Jung, and B. Pesquet-Popescu and relates to the cases where, as in the H264/AVC standard, the macroblocks are split according to a plurality of partitions generally having the shape of blocks of smaller size. According to this scheme, the motion vector of a macroblock of a current image is predicted with respect to a reference motion vector which is chosen as being the vector pointing at the pixel situated at the top and furthest on the left of the macroblock having the same position as the current macroblock in a previous image.

If one attempts to apply the latter scheme to the prediction of the vector MVp1 of FIG. 1A or to that of the vector MVp1 of FIG. 1C:

the vector MVp1 of FIG. 1A is obtained on the basis of a reference motion vector which is associated with the reference partition r'2, the leftmost pixel of the reference partition p'1 being situated in the reference partition r'2;

the vector MVp1 of FIG. 1C is obtained on the basis of a reference motion vector which is associated with the reference partition r'1, the leftmost pixel of the reference partition p'1 being situated in the reference partition r'1.

Neither is the prediction obtained with this coding scheme suited to the various possible types of partitioning for the same reasons as those mentioned above in conjunction with the prediction scheme used in the H264/AVC standard.

OBJECT AND SUMMARY OF THE INVENTION

One of the aims of the invention is to remedy drawbacks of the aforementioned prior art.

For this purpose, according to a first aspect, the present invention relates to a method of spatial prediction of a motion vector of a partition of a current image, on the basis of a plurality of n reference motion vectors associated respectively with n reference partitions of the current image which have been previously coded and then decoded.

According to the invention, in the case where the geometric shape of the current partition is different from that of k neighbor reference partitions, with k≤n, the motion vector of the current image partition is determined on the basis of a function of at least one reference motion vector which belongs to a set of k reference motion vectors associated respectively with the k neighbor reference partitions.

Such an arrangement thus makes it possible to significantly improve the precision of the prediction of the motion vector of a current partition, by taking account:

of the particular partitioning of the current macroblock,
of the difference in shape or in size between the current partition considered and the neighboring reference partitions.

Furthermore, the prediction according to the invention is adaptable to any type of scheme for calculating the predicted motion vector of the current partition, such as in particular that in accordance with the H264/AVC standard and that described in the aforementioned IEEE publication.

In one embodiment, the determination of the motion vector of the current partition comprises the steps of:

spatial expansion of at least one pixel of the current partition,
selection, from among the set of the k neighbor reference partitions of said current partition, of a subset of $k_c$ reference partitions which overlap the expanded current partition,
calculation of the mean of the $k_c$ reference motion vectors corresponding respectively to the $k_c$ selected reference partitions.

Such an arrangement thus makes it possible to select very precise reference motion vectors on the basis of a choosing criterion which is based here on the proximity between on the one hand the current partition and, on the other hand, the closest reference partition(s).

In another embodiment, the determination of the motion vector of the current partition comprises the steps of:

determination, on the one hand of the center of the current partition, and on the other hand, of the center of each of the k neighbor reference partitions,
calculation of the distance which separates the determined center of the current partition with respectively the determined center of each of the k neighbor reference partitions,
selection, from among the k neighbor reference partitions, of that whose center is situated the smallest calculated distance from the current partition,
selection of the reference motion vector corresponding to the selected reference partition.

According to a particular execution modality, the determination of the motion vector of the current partition comprises the steps of:

selection, from among the set of the k neighbor reference partitions of the current partition, of a subset of $k_p$ reference partitions which are closest to the current partition,
calculation of the respective distances between on the one hand the center of the current partition, and on the other hand, the center of each of the $k_p$ closest reference partitions,
calculation of the mean of the $k_p$ reference motion vectors corresponding respectively to the $k_p$ selected reference partitions, the mean being weighted by the respective distances calculated.

Such arrangements thus make it possible to select in a yet finer and more targeted manner one or more reference motion vectors on the basis of a choosing criterion which is based here not only on the proximity between the current partition and the closest reference partition(s), but also on a comparison of the distance between on the one hand the center of the current partition and, on the other hand, the center of each of the neighbor reference partitions.

In another embodiment, the determination of the motion vector of the current partition comprises the steps of:

prolongation of an edge of the current partition on at least certain of the k neighbor reference partitions,
selection, from among the certain neighbor reference partitions, of a subset of $k_{prol}$ reference partitions which are situated on one and the same side of the prolonged edge,
calculation of the mean of the $k_{prol}$ reference motion vectors corresponding respectively to the $k_{prol}$ selected reference partitions.

Such an arrangement thus makes it possible to select in a targeted manner one or more very precise reference motion vectors on the basis of a choosing criterion which is based here on the existence of a discontinuity in the previously coded and then decoded macroblocks. The precision of the prediction is thus improved since it is obtained on the basis of reference motion vectors which are assumed to be more precise in a zone of the image which contains discontinuities than in a zone of the image that is homogeneous.

In another embodiment, the determination of the motion vector of the current partition comprises the steps of:
   determination of the longest edge of the current partition,
   selection, from among the k neighbor reference partitions, of a subset of $k_{bd}$ reference partitions having said edge in common.

Such an arrangement thus makes it possible to select very precise reference motion vectors on the basis of a choosing criterion which is based here on the proximity between on the one hand the current partition and, on the other hand, the closest reference partition(s).

Such a selection is moreover refined by the determination of the longest edge of the current partition which delimits these latter from at least one neighbor reference partition.

According to a first variant, the selection step is followed by a step of calculating the mean of the $k_{bd}$ reference motion vectors corresponding respectively to the $k_{bd}$ selected reference partitions.

According to a second variant, the selection step consists in choosing, from the subset of $k_{bd}$ reference partitions having said longest edge in common, the reference partition whose portion of edge in common is longest, and then the reference motion vector corresponding to the selected reference partition.

In yet another embodiment, the determination of the motion vector of the current partition comprises the steps of:
   calculation, on the one hand, of a mean pixel value of the current partition, and on the other hand, of a pixel value of the same type for each of the k neighbor reference partitions,
   selection, from among the k neighbor reference partitions, of that whose calculated mean pixel value is closest to that of the current partition,
   selection of the reference motion vector corresponding to the selected reference partition.

Such an arrangement thus makes it possible to select a very precise reference motion vector on the basis of a certain characteristic which is based here on the identification of a particular pixel component, such as for example the mean luminance of a pattern, of a color, of a contour, etc. . . . in a neighbor reference partition of the current partition.

According to a second aspect, the present invention relates to a method for coding an image or a sequence of images generating a data stream comprising data representative of at least one image partition, such a method comprising a step of spatial prediction of a motion vector of the image partition.

Such a coding method is characterized in that the spatial prediction is performed in accordance with the aforementioned spatial prediction method.

According to a third aspect, the present invention relates to a method for decoding a data stream representative of an image or of a sequence of images, said stream comprising data representative of at least one image partition, such a method comprising a step of spatial prediction of a motion vector of the image partition.

Such a method is characterized in that the spatial prediction is performed in accordance with the aforementioned spatial prediction method.

Correlatively, according to a fourth aspect, the present invention relates to a device for spatial prediction of a motion vector of a partition of a current image, on the basis of a plurality of n reference motion vectors associated respectively with n reference partitions of the current image which have been previously coded and then decoded.

According to the invention, in the case where the geometric shape of the current partition is different from that of k neighbor reference partitions, with k≤n, the spatial prediction device comprises a calculation module able to determine the motion vector of the current image partition on the basis of a function of at least one reference motion vector which belongs to a set of k reference motion vectors associated respectively with the k neighbor reference partitions.

Correlatively, according to a fifth aspect, the present invention relates to a device for coding an image or a sequence of images generating a data stream comprising data representative of at least one image partition, such a device comprising means for spatial prediction of a motion vector of the image partition.

Such a coding device is characterized in that the prediction means are contained in the aforementioned spatial prediction device. Correlatively, according to a sixth aspect, the present invention relates to a device for decoding a data stream representative of an image or of a sequence of images, said stream comprising data representative of at least one image partition, such a device comprising means for spatial prediction of a motion vector of the image partition.

Such a decoding device is characterized in that the prediction means are contained in the aforementioned spatial prediction device.

The invention further relates to a computer program comprising instructions for implementing one of the methods according to the invention, when it is executed on a computer.

The coding method, the decoding method, the spatial prediction device, the coding device and the decoding device exhibit at least the same advantages as those conferred by the spatial prediction method according to the present invention.

In a corresponding manner, the invention is also applicable to a temporal prediction of the motion vector. For this purpose, according to a seventh aspect, the present invention relates to a method for temporal prediction of a motion vector of a partition of a current image, the motion vector pointing at a reference image zone which has the same shape as the current partition and which belongs to a reference image different from the current image and having been previously split, on completion of a coding and then of a decoding, into a plurality of n partitions.

According to the invention, in the case where the reference image zone is arranged inside one of the n reference partitions, the motion vector of the current image partition is determined on the basis of a function of at least one reference motion vector belonging to a set of k reference motion vectors associated respectively with k partitions of the plurality of n reference partitions, the k partitions being neighbors of said reference image zone.

Such an arrangement thus makes it possible to significantly improve the precision of the temporal prediction of the motion vector of a current partition, by taking account:
   of the particular partitioning of the reference macroblock, of the difference in shape or in size between the reference image zone considered and the neighboring reference partitions.

Furthermore, the temporal prediction according to the invention is adaptable to any type of scheme for calculating the predicted motion vector of the current partition, such as in particular that in accordance with the H264/AVC standard and that described in the aforementioned IEEE publication.

In one embodiment, the determination of the motion vector of the current partition comprises the steps of:
  spatial expansion of at least one pixel of the reference image zone,
  selection, from among the set of the k neighbor reference partitions of the reference image zone, of a subset of $k_c$ reference partitions which overlap the expanded reference image zone,
  calculation of the mean of the $k_c$ reference motion vectors corresponding respectively to the $k_c$ selected reference partitions.

Such an arrangement thus makes it possible to select very precise reference motion vectors on the basis of a choosing criterion which is based here on the proximity between on the one hand the reference image zone and, on the other hand, the closest reference partition(s).

In another embodiment, the determination of the motion vector of the reference image zone comprises the steps of:
  determination, on the one hand of the center of the reference image zone, and on the other hand, of the center of each of the k neighbor reference partitions,
  calculation of the distance which separates the determined center of the reference image zone with respectively the determined center of each of the k neighbor reference partitions,
  selection, from among the k neighbor reference partitions, of that whose center is situated the smallest calculated distance from the reference image zone,
  selection of the reference motion vector corresponding to the selected reference partition.

According to a particular execution modality, the determination of the motion vector of the current partition comprises the steps of:
  selection, from among the set of the k neighbor reference partitions of the reference image zone, of a subset of $k_p$ reference partitions which are closest to the reference image zone,
  calculation of the respective distances between on the one hand the center of the reference image zone, and on the other hand, the center of each of the $k_p$ closest reference partitions,
  calculation of the mean of the $k_p$ reference motion vectors corresponding respectively to the $k_p$ selected reference partitions, the mean being weighted by the respective distances calculated.

Such arrangements thus make it possible to select in a still finer and more targeted manner one or more reference motion vectors on the basis of a choosing criterion which is based here not only on the proximity between the reference image zone and the closest reference partition(s), but also on a comparison of the distance between on the one hand the center of the reference image zone and, on the other hand, the center of each of the neighbor reference partitions.

In another embodiment, the determination of the motion vector of the current partition comprises the steps of:
  prolongation of an edge of the reference image zone on at least certain of the k neighbor reference partitions,
  selection, from among the certain neighbor reference partitions, of a subset of $k_{prol}$ reference partitions which are situated on one and the same side of the prolonged edge,
  calculation of the mean of the $k_{prol}$ reference motion vectors corresponding respectively to the $k_{prol}$ selected reference partitions.

Such an arrangement thus makes it possible to select in a targeted manner one or more very precise reference motion vectors on the basis of a choosing criterion which is based here on the existence of a discontinuity in the previously coded and then decoded macroblocks. The precision of the temporal prediction is thus improved since it is obtained on the basis of reference motion vectors which are assumed to be more precise in a zone of the image which contains discontinuities than in a zone of the image that is homogeneous.

In another embodiment, the determination of the motion vector of the current partition comprises the steps of:
  determination of the longest edge of the reference image zone,
  selection, from among the k neighbor reference partitions, of a subset of $k_{bd}$ reference partitions having said edge in common.

Such an arrangement thus makes it possible to select very precise reference motion vectors on the basis of a choosing criterion which is based here on the proximity between on the one hand the reference image zone and, on the other hand, the closest reference partition(s).

Such a selection is moreover refined by the determination of the longest edge of the reference image zone which delimits these latter from at least one neighbor reference partition.

According to a first variant, the selection step is followed by a step of calculating the mean of the $k_{bd}$ reference motion vectors corresponding respectively to the $k_{bd}$ selected reference partitions.

According to a second variant, the selection step consists in choosing, from the subset of $k_{bd}$ reference partitions having said longest edge in common, the reference partition whose portion of edge in common is longest, and then the reference motion vector corresponding to the selected reference partition.

In yet another embodiment, the determination of the motion vector of the current partition comprises the steps of:
  calculation, on the one hand, of a mean pixel value of the reference image zone, and on the other hand, of a pixel value of the same type for each of the k neighbor reference partitions,
  selection, from among the k neighbor reference partitions, of that whose calculated mean pixel value is closest to that of the reference image zone,
  selection of the reference motion vector corresponding to the selected reference partition.

Such an arrangement thus makes it possible to select a very precise reference motion vector on the basis of a certain characteristic which is based here on the identification of a particular pixel component, such as for example the mean luminance of a pattern, of a color, of a contour, etc. . . . in a neighbor reference partition of the reference image zone.

According to an eighth aspect, the present invention relates to a method for coding an image or a sequence of images generating a data stream comprising data representative of at least one image partition, such a method comprising a step of temporal prediction of a motion vector of the image partition.

Such a coding method is characterized in that the temporal prediction is performed in accordance with the aforementioned temporal prediction method.

According to a ninth aspect, the present invention relates to a method for decoding a data stream representative of an image or of a sequence of images, said stream comprising data representative of at least one image partition, such a method comprising a step of temporal prediction of a motion vector of the image partition.

Such a method is characterized in that the temporal prediction is performed in accordance with the aforementioned temporal prediction method.

Correlatively, according to a tenth aspect, the present invention relates to a device for temporal prediction of a motion vector of a partition of a current image, the motion vector pointing at a reference image zone which has the same shape as the current partition and which belongs to a reference image different from the current image and having been previously split, on completion of a coding and then of a decoding, into a plurality of n partitions.

According to the invention, in the case where the reference image zone is arranged inside one of the n reference partitions, the temporal prediction device comprises a calculation module able to determine the motion vector of the current image partition on the basis of a function of at least one reference motion vector belonging to a set of k reference motion vectors associated respectively with k partitions of the plurality of n reference partitions, the k partitions being neighbors of the reference image zone.

Correlatively, according to an eleventh aspect, the present invention relates to a device for coding an image or a sequence of images generating a data stream comprising data representative of at least one image partition, such a device comprising means of temporal prediction of a motion vector of the image partition.

Such a coding device is characterized in that the prediction means are contained in the aforementioned temporal prediction device.

Correlatively, according to a twelfth aspect, the present invention relates to a device for decoding a data stream representative of an image or of a sequence of images, said stream comprising data representative of at least one image partition, such a device comprising means of temporal prediction of a motion vector of the image partition.

Such a decoding device is characterized in that the prediction means are contained in the aforementioned temporal prediction device.

The invention further relates to a computer program comprising instructions for implementing one of the methods according to the invention, when it is executed on a computer.

The coding method, the decoding method, the temporal prediction device, the coding device and the decoding device exhibit at least the same advantages as those conferred by the temporal prediction method according to the present invention.

BRIEF DESCRIPTION OF THE DRAWINGS

Other characteristics and advantages will become apparent on reading a preferred embodiment described with reference to the figures in which:

FIGS. 7A and 7B represent a fourth scheme for predicting a motion vector in accordance with the invention, according to the two types of prediction, respectively spatial and temporal, FIGS. 8A and 8B represent a fifth scheme for predicting a motion vector in accordance with the invention, according to the two types of prediction, respectively spatial and temporal.

DETAILED DESCRIPTION OF AN EMBODIMENT

An embodiment of the invention will now be described, in which the coding method according to the invention is used to Inter-code a sequence of images according to a binary stream much like that which is obtained via a coding according to the H.264/MPEG-4 AVC standard. In this embodiment, the coding method according to the invention is for example implemented in a software or hardware manner by modifications of a coder initially complying with the H.264/MPEG-4 AVC standard. The coding method according to the invention is represented in the form of an algorithm comprising steps C0 to C6, represented in FIG. 2.

Figure 3:
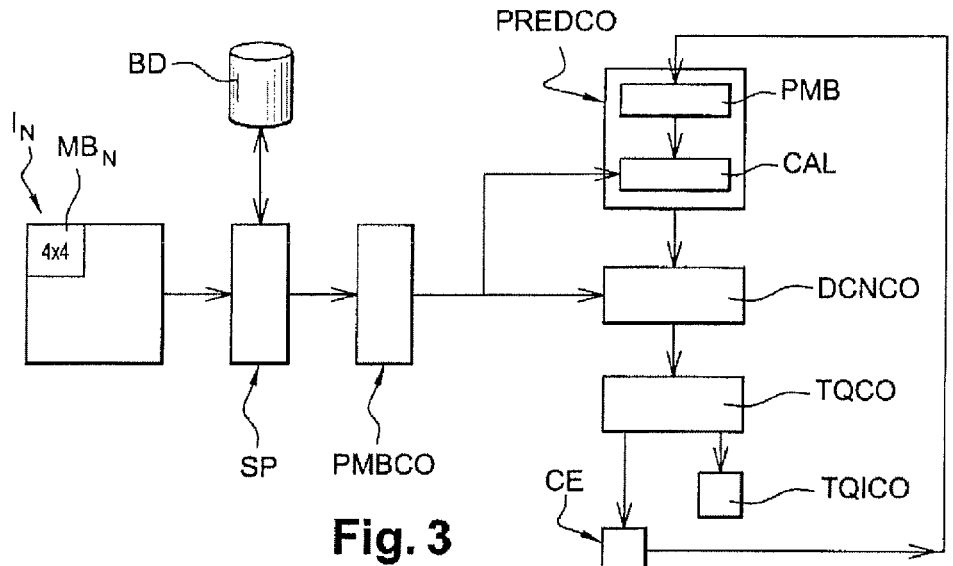
FIG. 3 represents an embodiment of a coding device according to the invention.

The coding method according to the invention is implemented in a coding device CO represented in FIG. 3.

Figure 1A:
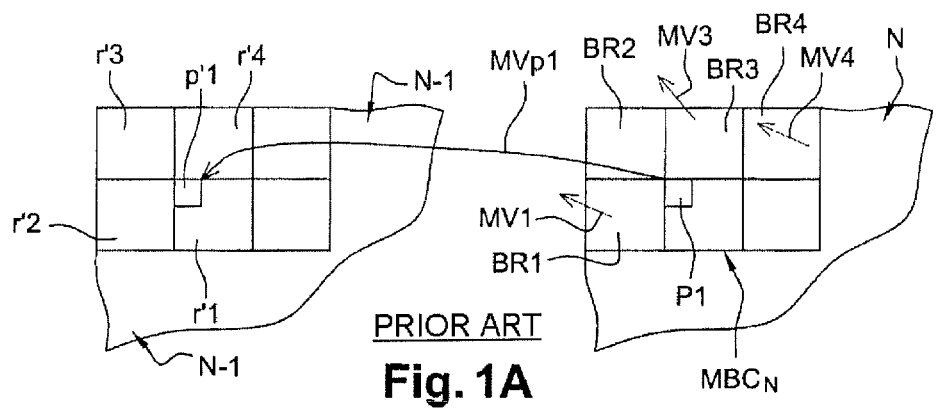
FIG. 1A represents an exemplary temporal prediction of the prior art which utilizes the temporal correlations between a current macroblock to be coded of an image N and a reference macroblock of a previous image N−1, the reference macroblock having a square shape and being arranged inside a neighbor reference macroblock.
Figure 1B:
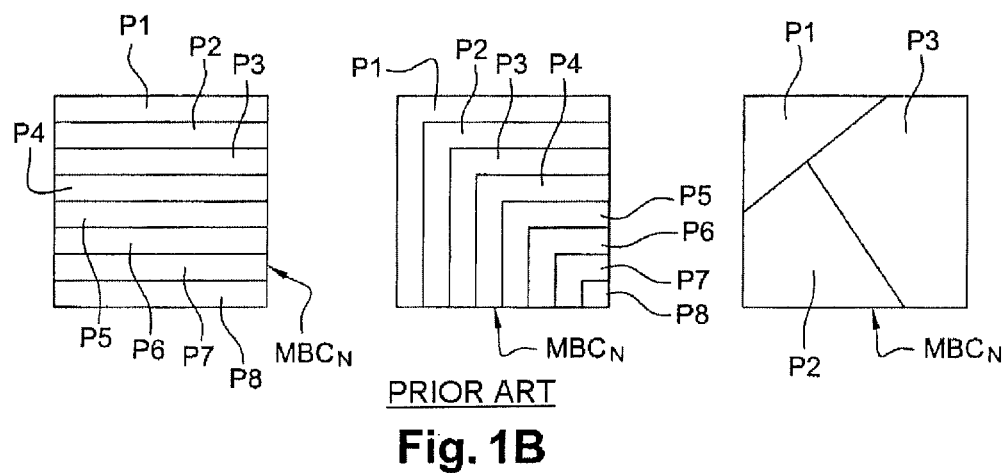
FIG. 1B represents a macroblock split according to various types of partitions of the prior art.
Figure 1C:
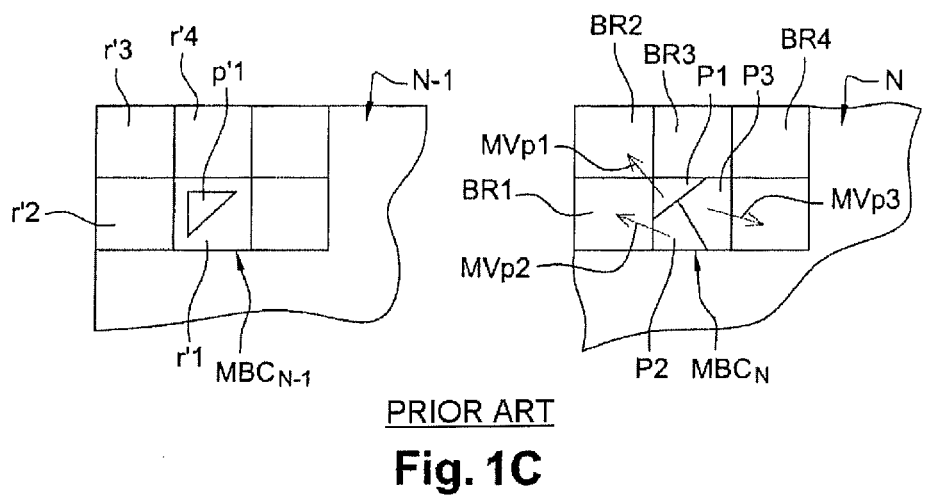
FIG. 1C represents an exemplary temporal prediction of the prior art which utilizes the temporal correlations between a current macroblock to be coded of an image N and a reference macroblock of a previous image N−1, the current macroblock being split according to several partitions of arbitrary shape, the motion vector of one of these partitions pointing at a reference image zone which is arranged inside a neighbor reference macroblock.
Figure 1D:
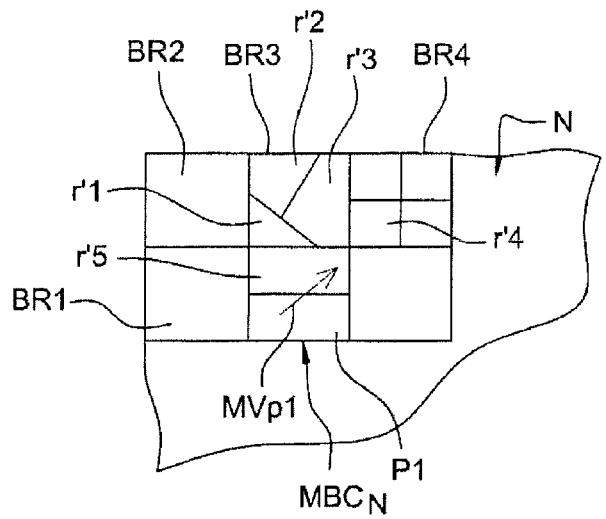
FIG. 1D represents an exemplary spatial prediction of the prior art which utilizes the spatial correlations between a current macroblock to be coded of an image N and of neighbor reference partitions of this image.
Figure 2:
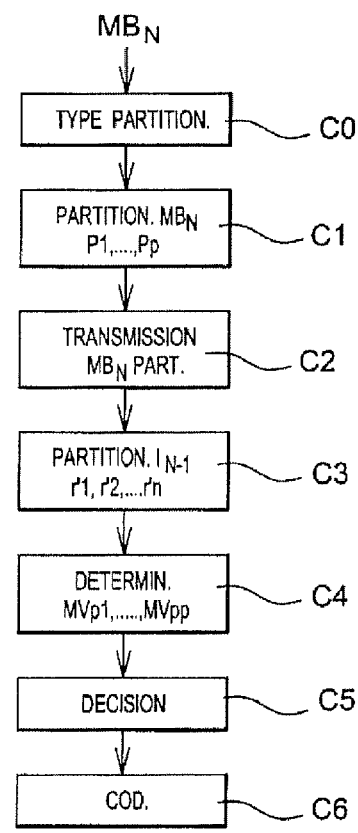
FIG. 2 represents the steps of the coding method according to the invention.

The first step C0, represented in FIG. 2, is the selection, for a macroblock belonging to an image of the sequence of images to be coded, denoted $I_N$ in FIG. 3, of a particular partitioning associated with this macroblock.

It should be noted that step C0 can be optional, the prediction of the motion vector of the current macroblock possibly being performed by considering the latter in its entirety, that is to say as one single partition.

In the course of step C0, a macroblock $MB_N$, for example of 4×4 size, and belonging to the image $I_N$, is applied as input to a partitioning selection module SP represented in FIG. 3.

This partitioning module SP uses for example a scheme for choosing by exhaustive competition or else a scheme for choosing with the aid of an algorithm with a-priori. Such schemes are well known to the person skilled in the art (cf: G. J. Sullivan and T. Wiegand, "Rate-distortion optimization for video compression", *IEEE Signal Proc. Mag., pp.* 74-90, 1998). They will not therefore be described hereinafter.

The various types of possible partitioning algorithms are grouped together in a database BD of the coder CO. They make it possible to obtain a splitting of the current macroblock into a plurality of partitions either of rectangular or square shape, or of other geometric shapes, such as for example substantially linear shapes, or of entirely arbitrary shape.

The following step C1 represented in FIG. 2 is the splitting of the macroblock $MB_N$ into a number of p partitions to be predicted. In the example represented in FIG. 4A, the macroblock $MB_N$ is split up into for example four smaller partitions P1, P2, P3 and P4 of square shape. Such a splitting is performed by a macroblocks partitioning module PMBCO represented in FIG. 3 which uses a conventional partitioning algorithm.

Subsequent to the partitioning step C1, in the course of a step C2 represented in FIG. 2, the partitioning module PMBCO transmits the macroblock $MB_N$ which has just been partitioned to a prediction module PREDCO represented in FIG. 3.

In a conventional manner, such a prediction module PREDCO is intended to predict the current macroblock $MB_N$ partitioned with respect to a plurality of n reference partitions belonging either to a previous image $I_{N-1}$ which has been previously coded and then decoded, or to the current image $I_N$.

Figure 4A:
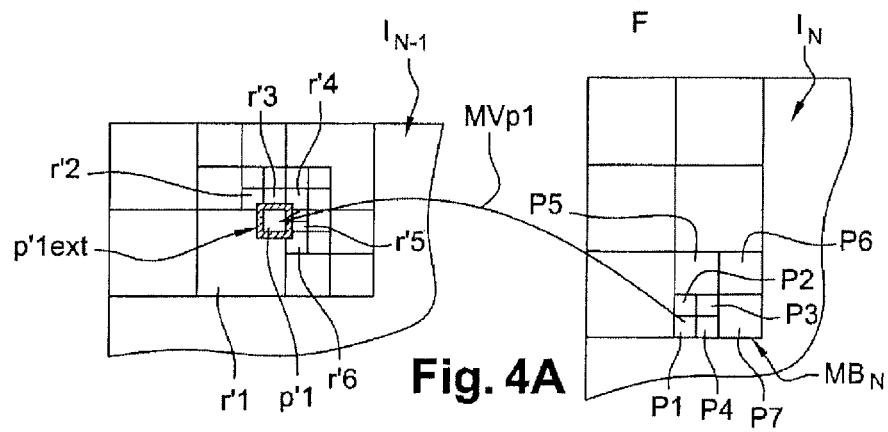
FIGS. 4A and 4B represent a first scheme for predicting a motion vector in accordance with the invention, according to the two types of prediction, respectively spatial and temporal.

In the example represented in FIG. 4A, six reference partitions r'1, r'2, r'3, r'4, r'5 and r'6 are represented.

With reference to FIG. 3, the reference partitions of the previous image $I_{N-1}$ are coded in accordance with the H.264/MPEG-4AVC standard, that is to say they undergo, in a manner known per se:
- a coding by discrete cosine transform and quantization which is performed by a transform and quantization module TQCO,
- and then a decoding by inverse discrete cosine transform and inverse quantization, which is performed by the inverse transform and quantization module TQICO.

Still with reference to FIG. 3, the prediction module PREDCO comprises:
- a partitioning module PMB intended to split the reference macroblocks of the image $I_{N-1}$ according to a plurality of n reference partitions r'1, r'2, . . . , r'n.
- a calculation module CAL intended to predict each motion vector MVp1, MVp2, . . . , MVpp which are associated respectively with the partitions P1, P2, . . . , Pp of the current macroblock $MB_N$.

In accordance with the invention, according to the type of prediction of the motion vector MVp1, MVp2, . . . , MVpp, namely either spatial, or temporal, in the case where respectively either the current partition P1, P2, . . . , Pp, or the reference image zone p'1, p'2, . . . , p'p pointed at by the motion vector MVp1, MVp2, . . . , MVpp, has a geometric shape or a size respectively different from the geometric shape or from the size of at least one reference partition chosen from among k neighboring reference partitions, where k≤n, the calculation module CAL predicts the motion vector of the current image partition on the basis of a function of at least one reference motion vector which belongs to a set of k reference motion vectors associated respectively with the k neighbor reference partitions.

In the course of step C3 represented in FIG. 2, the partitioning module PMB of FIG. 3 undertakes the splitting of the reference image $I_{N-1}$ according to n reference partitions r'1, r'2, . . . , r'n.

In the course of step C4 represented in FIG. 2, the calculation module CAL of FIG. 3 calculates, for each current partition, the predicted motion vector which is respectively associated therewith, according to the various schemes according to the invention described hereinbelow.

According to a first scheme for predicting the motion vector, such as represented in FIG. 4A, in the case of a prediction of temporal type, having regard to the fact that the reference image zone p'1 pointed at by the motion vector MVp1 is arranged inside the neighboring reference partition r'1 which exhibits a different size from that of the reference image zone p'1, the module CAL undertakes an expansion of at least one pixel of the reference image zone p'1. Such an expansion consists for example of a propagation of a morphological expansion mathematical operator well known to the person skilled in the art. In the example represented, the expansion performed is of a single pixel and is represented by the hatched zone in FIG. 4A. The calculation module CAL thereafter selects a subset of $k_c$ neighboring reference partitions which overlap the expanded reference image zone p'1 ext. In the example represented, these are the $k_c$ neighboring reference partitions r'1, r'2, r'3, r'4, r'5 and r'6. The calculation module CAL then determines the predicted motion vector MVp1 of the current partition P1 as a function of the reference motion vectors MVr'1, MVr'2, MVr'3, MVr'4, MVr'5 and MVr'6 associated respectively with the six overlapping reference partitions r'1, r'2, r'3, r'4, r'5 and r'6 represented in FIG. 4A. Such a determination consists for example in calculating the median of the reference motion vectors MVr'1, MVr'2, MVr'3, MVr'4, MVr'5, MVr'6 in accordance with the equation hereinbelow:

MVp1=Mean (MVr'1, MVr'2, MVr'3, MVr'4, MVr'5, MVr'6)

According to a variant of this first scheme, the module CAL determines a mean of the reference motion vectors MVr'1, MVr'2, MVr'3, MVr'4, MVr'5, MVr'6 which is weighted by the common number of pixels shared between the expanded reference image zone p'1ext and each of the reference partitions r'1, r'2, r'3, r'5, r'6 overlapping the latter. Such a determination amounts to calculating the predicted motion vector MVp1 in accordance with the equation hereinbelow:

$$MVp1 = \frac{1}{\sum_{k_c} \lceil p'1ext \cap r'_{k_c} \rceil} \cdot (mvr'_{k_c} \cdot \lceil p'1ext \cap r'_{k_c} \rceil) \text{ with: } -k_c = 6,$$

and $-\lceil p'1ext \cap r'k_c \rceil$ representing the common number of pixels shared between the expanded reference image zone p'1ext and each of the reference partitions r'1, r'2, r'3, r'4, r'5, r'6 overlapping the latter.

In the example represented in FIG. 4A, $$MVp1 = \frac{1}{20} \cdot (9r'_1 + 4r'_3 + 4r'_5 + r'_2 + r'_4 + r'_6).$$

Figure 4B:
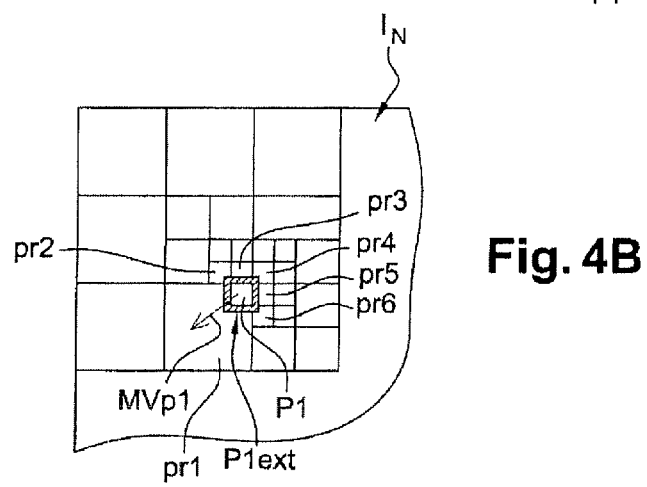

The first scheme and its variant which have just been described hereinabove may be applied to the spatial prediction of a motion vector MVp1 such as represented in FIG. 4B. In the example represented, having regard to the fact that the current partition P1 has a different size from the neighboring reference partition pr1, the module CAL undertakes an expansion of at least one pixel of the current partition P1 as described hereinabove with reference to FIG. 4A, so as to obtain an expanded current partition P1ext. In the example represented, the expansion performed is of a single pixel and is represented by the hatched zone in FIG. 4B. The calculation module CAL thereafter selects a subset of $k_c$ neighboring reference partitions which overlap the expanded current partition P1ext. In the example represented, these are the $k_c$ neighboring reference partitions pr1, pr2, pr3, pr4, pr5 and pr6. The calculation module CAL then determines the predicted motion vector MVp1 of the current partition P1 as a function of the reference motion vectors MVr1, MVr2, MVr3, MVr4, MVr5 and MVr6 associated respectively with the six overlapping reference partitions pr1, pr2, pr3, pr4, pr5 and pr6 represented in FIG. 4B. Such a determination consists for example in calculating the median of the reference motion vectors MVr1, MVr2, MVr3, MVr4, MVr5, MVr6 in accordance with the equation hereinbelow:

MVp1=Mean (MVr1, MVr2, MVr3, MVr4, MVr5, MVr6)

As a variant, the module CAL determines a mean of the reference motion vectors MVr1, MVr2, MVr3, MVr4, MVr5, MVr6 which is weighted by the common number of pixels shared between the expanded current partition P1ext and each of the reference partitions pr1, pr2, pr3, pr4, pr5, pr6 overlapping the latter.

A second motion vector prediction scheme will now be described with reference to FIG. 5A. In the example represented, the macroblock $MB_N$ is split up into for example three partitions P1, P2 and P3 of arbitrary shape. The reference image $I_{N-1}$ is for its part split according to n reference partitions r'1, r'2, . . . , r'n.

Figure 5A:
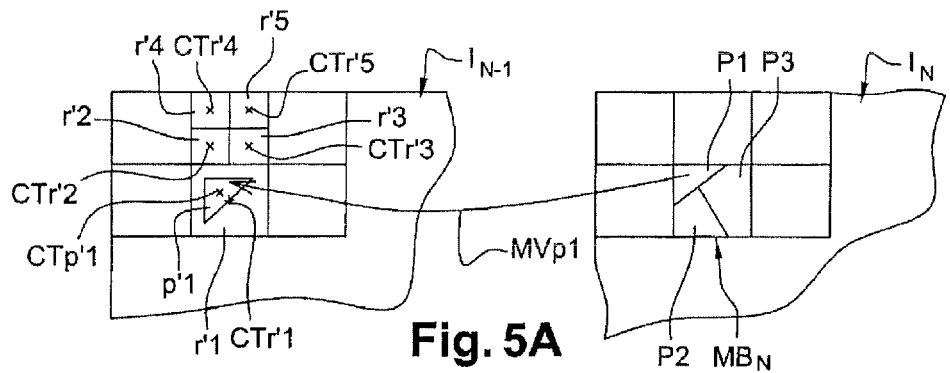
FIGS. 5A and 5B represent a second scheme for predicting a motion vector in accordance with the invention, according to the two types of prediction, respectively spatial and temporal.

According to the second motion vector prediction scheme such as represented in FIG. 5A, in the case of a prediction of temporal type, having regard to the fact that the reference image zone p'1 pointed at by the motion vector MVp1 has a different geometric shape from that of the neighboring reference partition r'1, the module CAL determines the center, denoted CTp'1 in FIG. 5A, of the reference image zone p'1, and on the other hand, the corresponding center CTr'1, CTr'2, CTr'3, CTr'4, CTr'5 of each of the neighbor reference partitions r'1, r'2, r'3, r'4, r'5. The module CAL thereafter calculates the distance which separates the center CTp'1 of the reference image zone p'1 with respectively each of the centers CTr'1, CTr'2, CTr'3, CTr'4, CTr'5. The centers CTp'1, CTr'1, CTr'2, CTr'3, CTr'4, CTr'5 are calculated by means of an algorithm which minimizes the sum of the distances with respect to all the points of the reference image zone P'1, and of the reference partitions r'1, r'2, r'3, r'4, r'5 respectively. The module CAL then selects, from among the neighbor reference partitions r'1, r'2, r'3, r'4, r'5, that whose center is situated the smallest calculated distance from the reference image zone p'1. In the example represented, this is the reference partition r'1. Finally, the module CAL calculates the predicted motion vector MVp1 as being equal to the reference motion vector MVr'1 corresponding to the selected reference partition r'1.

In the example represented in FIG. 5A, MVp1=MVr'1.

According to a variant of this second scheme, the module CAL selects, from among the set of neighbor reference partitions r'1 to r'5, those which are closest to the reference image zone p'1. In the example represented, these are the reference partitions r'1, r'2 and r'3. The module CAL thereafter determines the center CTp'1 of the reference image zone p'1, and on the other hand, the corresponding center CTr'1, CTr'2, CTr'3 of each of the closest reference partitions r'1, r'2, r'3. The module CAL thereafter calculates the distance which separates the center CTp'1 of the reference image zone p'1 with respectively each of the centers CTr'1, CTr'2, CTr'3. The module CAL calculates the predicted motion vector MVp1 as being equal to the mean of the reference motion vectors MVr'1, MVr'2, MVr'3, said mean being weighted by the three respective distances calculated.

Figure 5B:
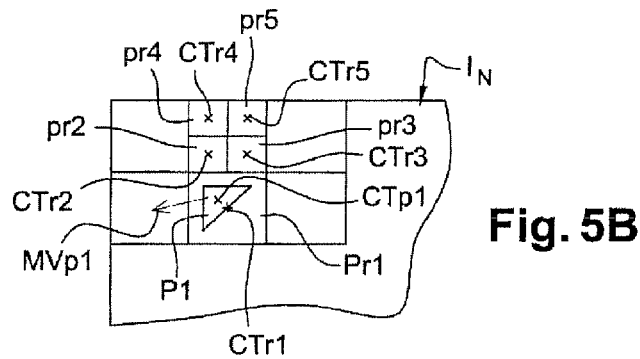

The second scheme and its variant which have just been described hereinabove may be applied to the spatial prediction of a motion vector MVp1 such as represented in FIG. 5B. In the example represented, having regard to the fact that the current partition P1 has a different geometric shape from that of the neighboring reference partition pr1, the module CAL determines the center, denoted CTp1 in FIG. 5B, of the current partition P1, and on the other hand, the corresponding center CTr1, CTr2, CTr3, CTr4, CTr5 of each of the neighbor reference partitions pr1, pr2, pr3, pr4, pr5. The module CAL thereafter calculates the distance which separates the center CTp1 of the current partition P1 with respectively each of the centers CTr1, CTr2, CTr3, CTr4, CTr5. The module CAL then selects, from among the neighbor reference partitions pr1, pr2, pr3, pr4, pr5, that whose center is situated the smallest calculated distance from the current partition P1. In the example represented, this is the reference partition pr1. Finally, the module CAL calculates the predicted motion vector MVp1 as being equal to the reference motion vector MVr1 corresponding to the selected reference partition pr1.

In the example represented in FIG. 5B, MVp1=MVr1.

As a variant, the module CAL selects, from among the set of neighbor reference partitions pr1 to pr5, those which are closest to the current partition P1. In the example represented, these are the reference partitions pr1, pr2 and pr3. The module CAL thereafter determines the center CTp1 of the current partition P1, and on the other hand, the corresponding center CTr1, CTr2, CTr3 of each of the reference partitions pr1, pr2, pr3. The module CAL thereafter calculates the distance which separates the center CTp1 of the current partition P1 with respectively each of the centers CTr1, CTr2, CTr3. The module CAL calculates the predicted motion vector MVp1 as being equal to the mean of the reference motion vectors MVr1, MVr2, MVr3, said mean being weighted by the three respective distances calculated.

A third motion vector prediction scheme will now be described with reference to FIG. 6A. In the example represented, the macroblock $MB_N$ is split up into for example three partitions P1, P2 and P3 of arbitrary shape. The reference image $I_{N-1}$ is for its part split according to n reference partitions r'1, r'2, . . . , r'n.

Figure 6A:
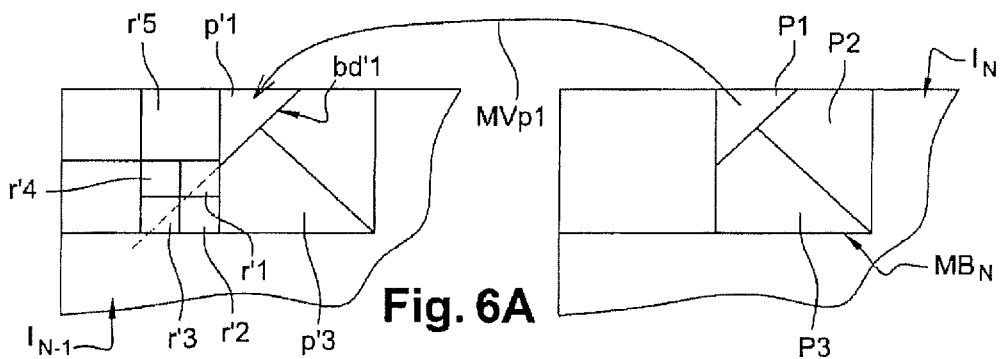
FIGS. 6A and 6B represent a third scheme for predicting a motion vector according to the invention, according to the two types of prediction, respectively spatial and temporal.

According to the third motion vector prediction scheme such as represented in FIG. 6A, in the case of a prediction of temporal type, having regard to the fact that the reference image zone p'1 pointed at by the motion vector MVp1 has a different geometric shape from that of the neighboring reference partitions r'1 to r'5, the module CAL undertakes the prolongation of an edge bd'1 of the reference image zone p'1 on at least some of the aforementioned neighbor reference partitions. The prolongation is represented by a dashed line in FIG. 6A. The module CAL thereafter selects, from among the neighbor reference partitions, the reference partitions which are situated on one and the same side of the prolonged edge. In the example represented, these are the reference partitions r'1, r'2, r'3. The module CAL then calculates the predicted motion vector MVp1 as being equal to the mean of the reference motion vectors MVr'1, MVr'2, MVr'3 which are associated respectively with the selected reference partitions r'1, r'2, r'3.

Figure 6B:
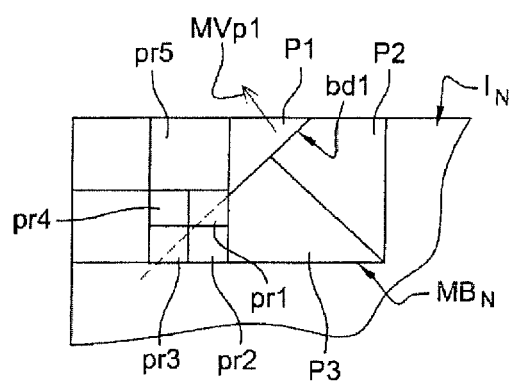

The third scheme which has just been described hereinabove may be applied to the spatial prediction of a motion vector MVp1 such as represented in FIG. 6B. In the example represented, having regard to the fact that the current partition P1 has a different geometric shape from that of the neighboring reference partitions pr1 to pr5, the module CAL undertakes the prolongation of an edge bd1 of the current partition P1 on at least some of the aforementioned neighbor reference partitions. The prolongation is represented by a dashed line in FIG. 6B. The module CAL thereafter selects, from among the neighbor reference partitions, the reference partitions which are situated on one and the same side of the prolonged edge. In the example represented, these are the reference partitions pr1, pr2, pr3. The module CAL then calculates the predicted motion vector MVp1 as being equal to the mean of the reference motion vectors MVr1, MVr2, MVr3 which are associated respectively with the selected reference partitions pr1, pr2, pr3.

A fourth motion vector prediction scheme will now be described with reference to FIG. 7A. In the example represented, the macroblock $MB_N$ is split up into for example two partitions P1 and P2 of arbitrary shape. The reference image $I_{N-1}$ is for its part split according to n reference partitions r'1, r'2, . . . , r'n.

According to the fourth motion vector prediction scheme such as represented in FIG. 7A, in the case of a prediction of temporal type, having regard to the fact that the reference image zone p'1 pointed at by the motion vector MVp1 has a different geometric shape from the neighboring reference partitions r'1 to r'5, the module CAL determines the longest edge of the reference image zone p'1. Such an edge is denoted bdl'1 in FIG. 7A. The module CAL thereafter selects, from among the neighbor reference partitions r'1 to r'5, the reference partitions having the edge bdl'1 in common. In the example represented, these are the reference partitions r'3 and r'4.

According to a first variant of this fourth scheme, the module CAL calculates the predicted motion vector MVp1 as being equal to the mean of the reference motion vectors MVr'3 and MVr'4 which are associated respectively with the selected reference partitions r'3 and r'4.

According to a second variant, the module CAL weights said calculated mean by the length of the edge of the reference partition r'3 which is in common with the reference image zone p'1 and by the length of the edge of the reference partition r'4 which is in common with the reference image zone p'1.

According to a third variant, the module CAL selects, from among the two reference partitions r'3 and r'4, that whose edge in common with the reference image zone p'1 is the longest. In the example represented, this is the reference partition r'3. The module CAL thereafter calculates the predicted motion vector MVp1 as being equal to the reference motion vector MVr'3 corresponding to the selected reference partition r'3.

In the example represented in FIG. 7A, MVp1=MVr'3.

The fourth scheme and its three variants which have just been described hereinabove may be applied to the spatial prediction of a motion vector MVp1 such as represented in FIG. 7B. In the example represented, having regard to the fact that the current partition P1 has a different geometric shape from that of the neighboring reference partitions pr1 to pr5, the module CAL determines the longest edge of the current partition P1. Such an edge is denoted bdl1 in FIG. 7B. The module CAL thereafter selects, from among the neighbor reference partitions pr1 to pr5, the reference partitions having the edge bdl1 in common. In the example represented, these are the reference partitions pr3 and pr4.

According to the three aforementioned variants, the module CAL:
 calculates the predicted motion vector MVp1 as being equal to the mean of the reference motion vectors MVr3 and MVr4 which are associated respectively with the selected reference partitions pr3 and pr4,
 weights said calculated mean by the length of the edge of the reference partition pr3 which is in common with the current partition P1 and by the length of the edge of the reference partition pr4 which is in common with the current partition P1,
 calculates the predicted motion vector MVp1 as being equal to the reference motion vector MVr3 corresponding to the reference partition pr3 which has the longest edge in common with the current partition P1.

A fifth motion vector prediction scheme will now be described with reference to FIG. 8A. In the example represented, the macroblock $MB_N$ is split up into for example two equal partitions P1 and P2 of rectangular shape. The reference image $I_{N-1}$ is for its part split according to n reference partitions r'1, r'2, . . . , r'n.

According to the fifth motion vector prediction scheme such as represented in FIG. 8A, in the case of a prediction of temporal type, having regard to the fact that the reference image zone p'1 pointed at by the motion vector MVp1 has a different geometric shape from that of the neighboring reference partitions r'1 to r'5 and that moreover, it contains a pattern of a particular color such as for example a black circle C'1, the module CAL calculates the mean luminance of the reference image zone p'1 and of each of the neighbor reference partitions r'1 to r'5. It then selects, from among the neighbor reference partitions r'1 to r'5, that whose calculated mean luminance is closest to that of the reference image zone p'1. In the example represented, this is the reference partition r'2 which comprises a pattern C'2 similar to that of the reference image zone p'1. The module CAL thereafter calculates the predicted motion vector MVp1 as being equal to the reference motion vector MVr'2 corresponding to the selected reference partition r'2.

The fifth scheme which has just been described hereinabove may be applied to the spatial prediction of a motion vector MVp1 such as represented in FIG. 8B. In the example represented, having regard to the fact that the current partition P1 has a different geometric shape from that of the neighboring reference partitions pr1 to pr5 and that moreover, it contains a pattern of a particular color such as for example a black circle C1, the module CAL calculates the mean luminance of the current partition P1 and of each of the neighbor reference partitions pr1 to pr5. It then selects, from among the neighbor reference partitions pr1 to pr5, that whose calculated mean luminance is closest to that of the current partition P1. In the example represented, this is the reference partition pr2 which comprises a pattern Cr2 similar to that of the current partition P1. The module CAL thereafter calculates the predicted motion vector MVp1 as being equal to the reference motion vector MVr2 corresponding to the selected reference partition pr2.

On completion of the calculation step C4 in accordance with one or other of the aforementioned schemes according to the invention, the prediction calculation module PREDCO then delivers a first predicted vector MVp1 which, in the case where the latter is retained by the coder CO as being the type of optimal motion vector, is immediately coded by the transform and quantization module TQCO, and then decoded by the inverse transform and quantization module TQICO, which are represented in FIG. 3.

The aforementioned step C4 is thereafter repeated so as to predict the other motion vectors MVp2 to MVpp which are associated respectively with the partitions P2 to Pp of the current macroblock $MB_N$.

Once various possible predictions have been calculated by the prediction calculation module PREDCO, in the course of a step C5 represented in FIG. 2, a decision module DCNCO, represented in FIG. 3, scans the partitioned macroblocks of the image $I_N$ and chooses, in this step C5, the prediction mode used to code each of these macroblocks. From among the possible predictions for a macroblock, the decision module DCNCO chooses the optimal prediction according to a rate distortion criterion well known to the person skilled in the art.

With reference to FIG. 2, each predicted macroblock is coded, in the course of a step C6, as in the H.264/MPEG-4 AVC standard.

With reference to FIG. 3, once this structural coding has been performed by the decision module DCNCO, the coefficients of residuals if they exist, corresponding to the blocks of the image $I_N$, are dispatched to the transform and quantization module TQCO, to undergo discrete cosine transforms followed by a quantization. The slices of macroblocks with these quantized coefficients are thereafter transmitted to an entropy coding module CE represented, so as to produce, with the other images of the video sequence that have already been coded in the same manner as the image $I_N$, a binary video stream F coded according to the invention.

The binary stream F thus coded is transmitted by a communication network, to a remote terminal. The latter comprises a decoder DO according to the invention, represented in FIG. 9.

The binary stream F is firstly dispatched to an entropy decoding module DE, the decoding inverse to that performed by the entropy coding module CE represented in FIG. 3. Next, for each image macroblock to be reconstructed, the coefficients decoded by the module DE are dispatched to an inverse quantization and inverse transform module QTIDO.

Figure 10:
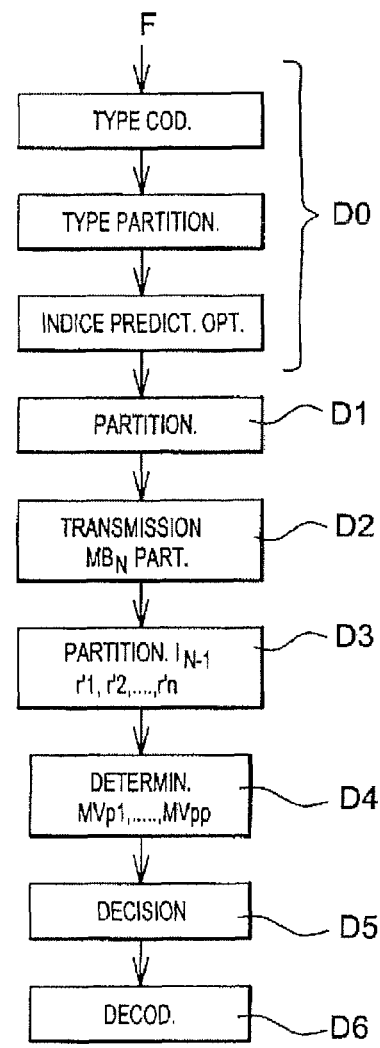
FIG. 10 represents steps of the decoding method according to the invention.

An image reconstruction module RI then receives decoded data corresponding to the data produced by the module DCNCO (FIG. 3) in coding step C5 according to the invention, to within transmission errors. The module RI implements steps D0 to D6, such as represented in FIG. 10, of the decoding method according to the invention. Such a decoding method according to the invention is also implemented in a software or hardware manner by modifications of a decoder initially complying with the H.264/MPEG-4 AVC standard.

The first step D0 is the decoding of data structures coded in a slice of a current macroblock of the image $I_N$ to be decoded. In a manner known per se, the reconstruction module RI determines on the basis of the data of said macroblock slice:

the type of coding of said data, Intra or Inter: Inter according to the invention,
the type of partitioning of the macroblock to be reconstructed, Inter 4×4, 8×8, line, etc. . . . : Inter 4×4 in the embodiment described,
the index of the optimal predictor such as selected by the decision module DCNCO in aforementioned step C5.

The following step D1 represented in FIG. 10 is the splitting of the current macroblock to be decoded, in accordance with the partitioning determined in step D0. For this purpose, with reference to FIG. 9, a macroblocks partitioning module PMBDO, which in all respects resembles that represented in FIG. 3, splits the macroblock into a plurality of p partitions, P1 to Pp.

Figure 9:
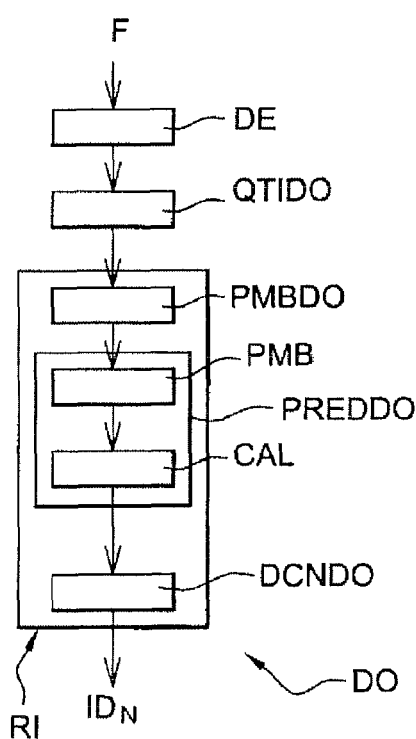
FIG. 9 represents a decoding device according to the invention.

In the course of a step D2 represented in FIG. 10, the partitioning module PMBDO transmits the current macroblock to be decoded, which has just been partitioned, to a prediction module PREDDO represented in FIG. 9, which is in all respects similar to the prediction module PREDCO of the coder CO of FIG. 3, and which, for this reason, will not be described again in detail.

In the course of steps D3 and D4 represented in FIG. 10, the prediction module PREDDO of FIG. 9 performs the same algorithm as that performed by the prediction module PREDCO of the aforementioned coder CO, so as to obtain a current macroblock whose associated motion vectors have been predicted in accordance with one or other of the five schemes described hereinabove.

In the course of a step D5, a decision module DCNDO chooses the optimal prediction according to a rate distortion criterion well known to the person skilled in the art.

Each predicted macroblock is thereafter decoded, in the course of a step D6, as in the H.264/MPEG-AVC standard.

Once all the macroblocks of the image $I_N$ have been decoded, with reference to FIG. 9, the image reconstruction module RI provides as output from the decoder DO, an image $ID_N$ corresponding to the decoding of the image $I_N$.

Having regard to the fact that the prediction algorithm performed at the decoder DO is in every respect the same as that performed at the coder CO, the information cost induced by the predictors used is greatly reduced.

It goes without saying that the embodiments which have been described hereinabove have been given purely by way of wholly non-limiting indication, and that numerous modifications may easily be made by the person skilled in the art without however departing from the scope of the invention.

The invention claimed is:

1. A method of spatial or temporal prediction of a motion vector of a partition of a current image ($I_N$), on the basis of a plurality of n reference motion vectors associated respectively with n reference partitions (r'1, r'2, . . . , r'n) of said current image ($I_N$) which have been previously coded and then decoded, said method being characterized in that in according to the type either spatial, or temporal, of prediction of a current motion vector associated to said partition of the current image, in the case where the geometric shape of either the current partition, or a reference image zone pointed at by the current motion vector, is different from that of k neighbor reference partitions (r'1, r'2, . . . r'k), with k≤n, the method comprises:

determining at least one reference motion vector from a set of k reference motion vectors (MVr'1, MVr'2, . . . , MVr'k) which are associated respectively with the k neighbor reference partitions;
using said at least one determined reference motion vector to estimate the current motion vector associated with said current image partition, said current motion vector describing the motion between said current image partition and a reference partition belonging to an image different from the current image;

obtaining a predictor of the motion vector as a result of said estimation, said obtained predictor of the motion vector being equal to said at least one selected reference motion vector;

predicting said current motion vector with said at least one selected reference motion vector; and obtaining predicted data as a result of said prediction, said predicted data being equal to said at least one selected reference motion vector.

2. The prediction method as claimed in claim 1, in which the determination of the motion vector of the current partition comprises the steps of:

spatial expansion of at least one pixel of said current partition, selection, from among the set of said k neighbor reference partitions of said current partition, of a subset of $k_c$ reference partitions which overlap said expanded current partition, calculation of the mean of the $k_c$ reference motion vectors corresponding respectively to the $k_c$ selected reference partitions.

3. The prediction method as claimed in claim 1, in which the determination of the motion vector of the current partition comprises the steps of:

determination, on the one hand of the center of said current partition, and on the other hand, of the center of each of said k neighbor reference partitions, calculation of the distance which separates the determined center of said current partition with respectively the determined center of each of said k neighbor reference partitions, selection, from among said k neighbor reference partitions, of that whose center is situated the smallest calculated distance from said current partition, selection of the reference motion vector corresponding to said selected reference partition.

4. The prediction method as claimed in claim 1, in which the determination of the motion vector of the current partition comprises the steps of:

selection, from among the set of said k neighbor reference partitions of said current partition, of a subset of $k_p$ reference partitions which are closest to the current partition, calculation of the respective distances between on the one hand the center of said current partition, and on the other hand, the center of each of the $k_p$ closest reference partitions, calculation of the mean of the $k_p$ reference motion vectors corresponding respectively to the $k_p$ selected reference partitions, said mean being weighted by the respective distances calculated.

5. The prediction method as claimed in claim 1, in which the determination of the motion vector of the current partition comprises the steps of:

prolongation of an edge of said current partition on at least certain of the k neighbor reference partitions, selection, from among said certain neighbor reference partitions, of a subset of $k_{prol}$ reference partitions which are situated on one and the same side of the prolonged edge, calculation of the mean of the $k_{prol}$ reference motion vectors corresponding respectively to the $k_{prol}$ selected reference partitions.

6. The prediction method as claimed in claim 1, in which the determination of the motion vector of the current partition comprises the steps of:

determination of the longest edge of said current partition, selection, from among said k neighbor reference partitions, of a subset of $k_{bd}$ reference partitions having said edge in common.

7. The prediction method as claimed in claim 6, in which the selection step is followed by a step of calculating the mean of the $k_{bd}$ reference motion vectors corresponding respectively to the $k_{bd}$ selected reference partitions.

8. The prediction method as claimed in claim 6, in which the selection step consists in choosing, from the subset of $k_{bd}$ reference partitions having said longest edge in common, the reference partition whose portion of edge in common is longest, and then the reference motion vector corresponding to said selected reference partition.

9. The prediction method as claimed in claim 1, in which the determination of the motion vector of the current partition comprises the steps of:

calculation, on the one hand, of a mean pixel value of said current partition, and on the other hand, of a pixel value of the same type for each of said k neighbor reference partitions, selection, from among the k neighbor reference partitions, of that whose calculated mean pixel value is closest to that of said current partition, selection of the reference motion vector corresponding to said selected reference partition.

10. A method for coding an image or a sequence of images generating a data stream (F) comprising data representative of at least one image partition, said method comprising a step of spatial or temporal prediction of a motion vector of said image partition, said method being characterized in that said spatial or temporal prediction comprises spatial or temporal prediction of the motion vector of a partition of a current image ($I_N$), on the basis of a plurality of n reference motion vectors associated respectively with n reference partitions (r'1, r'2, ..., r'n) of said current image ($I_N$) which have been previously coded and then decoded, said method being characterized in that according to the type either spatial, or temporal, of prediction of a current motion vector associated to said partition of the current image, in the case where the geometric shape of either the current partition, or a reference image zone pointed at by the current motion vector, is different from that of k neighbor reference partitions (r'1, r'2, ... r'k), with k≤n, the method comprises:

determining at least one reference motion vector from a set of k reference motion vectors (MVr'1, MVr'2, ..., MVr'k) which are associated respectively with the k neighbor reference partitions;

using said at least one determined reference motion vector to estimate the current motion vector associated with said current image partition, said current motion vector describing the motion between said current image partition and a reference partition belonging to an image different from the current image;

obtaining a predictor of the motion vector as a result of said estimation, said obtained predictor of the motion vector being equal to said at least one selected reference motion vector;

predicting said current motion vector with said at least one selected reference motion vector; and obtaining predicted data as a result of said prediction, said predicted data being equal to said at least one selected reference motion vector.

11. A method for decoding a data stream (F) representative of an image or of a sequence of images, said stream comprising data representative of at least one image partition, said method comprising a step of spatial or temporal prediction of a motion vector of said image partition, said method being characterized in that said spatial or temporal prediction comprises spatial or temporal prediction of the motion vector of a partition of a current image ($I_N$), on the basis of a plurality of n reference motion vectors associated respectively with n reference partitions (r'1, r'2, . . . ,r'n) of said current image ($I_N$) which have been previously coded and then decoded, said method being characterized in that according to the type either spatial, or temporal, of prediction of a current motion vector associated to said partition of the current image, in the case where the geometric shape of either the current partition, or a reference image zone pointed at by the current motion vector, is different from that of k neighbor reference partitions (r'1, r'2, . . . r'k), with k≤n, the method comprises:

determining at least one reference motion vector from a set of k reference motion vectors (MVr'1, MVr'2, . . . ,MVr'k) which are associated respectively with the k neighbor reference partitions;

using said at least one determined reference motion vector to estimate the current motion vector associated with said current image partition, said current motion vector describing the motion between said current image partition and a reference partition belonging to an image different from the current image;

obtaining a predictor of the motion vector as a result of said estimation, said obtained predictor of the motion vector being equal to said at least one selected reference motion vector;

predicting said current motion vector with said at least one selected reference motion vector; and obtaining predicted data as a result of said prediction, said predicted data being equal to said at least one selected reference motion vector.

12. A device for spatial or temporal prediction of a motion vector of a partition of a current image ($I_N$), on the basis of a plurality of n reference motion vectors associated respectively with n reference partitions (r'1, r'2, . . . , r'n) of said current image ($I_N$) which have been previously coded and then decoded, the prediction device being characterized in that according to the type either spatial, or temporal, of prediction of a current motion vector associated to said partition of the current image, in the case where the geometric shape of either the current partition, or a reference image zone pointed at by the current motion vector, is different from that of k neighbor reference partitions (r'1, r'2, . . . r'k), with k≤n, the spatial or temporal prediction device comprises a calculation module able to determine at least one reference motion vector from a set of k reference motion vectors (MVr'1, MVr'2, . . . , MVr'k) which are associated respectively with the k neighbor reference partitions, to use said at least one determined reference motion vector to estimate the current motion vector associated with said current image partition, said current motion vector describing the motion between said current image partition and a reference partition belonging to an image different from the current image, and to obtain a predictor of the motion vector as a result of said estimation, said obtained predictor of the motion vector being equal to said at least one selected reference motion vector, predicting said current motion vector with said at least one selected reference motion vector; and obtaining predicted data as a result of said prediction, said predicted data being equal to said at least one selected reference motion vector.

13. A device for coding an image or a sequence of images generating a data stream (F) comprising data representative of at least one image partition, said device comprising means for spatial or temporal prediction of a motion vector of said image partition, characterized in that said prediction means are contained in a spatial or temporal prediction device for spatial or temporal prediction of the motion vector of a partition of a current image ($I_N$), on the basis of a plurality of n reference motion vectors associated respectively with n reference partitions (r'1, r'2, . . . , r'n) of said current image ($I_N$) which have been previously coded and then decoded, the prediction device being characterized in that according to the type either spatial, or temporal, of prediction of a current motion vector associated to said partition of the current image, in the case where the geometric shape of either the current partition, or a reference image zone pointed at by the current motion vector, is different from that of k neighbor reference partitions (r'1, r'2, . . . r'k), with k≤n, the spatial or temporal prediction device comprises a calculation module able to determine at least one reference motion vector from a set of k reference motion vectors (MVr'1, MVr'2, . . . ,MVr'k) which are associated respectively with the k neighbor reference partitions, to use said at least one determined reference motion vector to estimate the current motion vector associated with said current image partition, said current motion vector describing the motion between said current image partition and a reference partition belonging to an image different from the current image, and to obtain a predictor of the motion vector as a result of said estimation, said obtained predictor of the motion vector being equal to said at least one selected reference motion vector, predicting said current motion vector with said at least one selected reference motion vector; and obtaining predicted data as a result of said prediction, said predicted data being equal to said at least one selected reference motion vector.

14. A device for decoding a data stream (F) representative of an image or of a sequence of images, said stream (F) comprising data representative of at least one image partition, said device comprising means for spatial or temporal prediction of a motion vector of said image partition, characterized in that said prediction means are contained in a spatial or temporal prediction device for spatial or temporal prediction of the motion vector of a partition of a current image ($I_N$), on the basis of a plurality of n reference motion vectors associated respectively with n reference partitions (r'1, r'2, . . . , r'n) of said current image ($I_N$) which have been previously coded and then decoded, the prediction device being characterized in that according to the type either spatial, or temporal, of prediction of a current motion vector associated to said partition of the current image, in the case where the geometric shape of either the current partition, or a reference image zone pointed at by the current motion vector, is different from that of k neighbor reference partitions (r'1, r'2, . . . r'k), with k≤n, the spatial or temporal prediction device comprises a calculation module able to determine at least one reference motion vector from a set of k reference motion vectors (MVr'1, MVr'2, . . . ,MVr'k) which are associated respectively with the k neighbor reference partitions, to use said at least one determined reference motion vector to estimate the current motion vector associated with said current image partition, said current motion vector describing the motion between said current image partition and a reference partition belonging to an image different from the current image, and to obtain a predictor of the motion vector as a result of said estimation, said obtained predictor of the motion vector being equal to said at least one selected reference motion vector, predicting said current motion vector with said at least one selected reference motion vector; and obtaining predicted data as a result of said prediction, said predicted data being equal to said at least one selected reference motion vector.

15. A non-transitory computer-readable medium comprising a computer program stored thereon comprising instructions for implementing a method for decoding a data stream (F) representative of an image or of a sequence of images, when the instructions are executed on a computer, said stream comprising data representative of at least one image partition, said method comprising a step of spatial or temporal prediction of a motion vector of said image partition, said method being characterized in that said spatial or temporal prediction comprises spatial or temporal prediction of the motion vector of a partition of a current image ($I_N$), on the basis of a plurality of n reference motion vectors associated respectively with n reference partitions (r'1, r'2, . . . ,r'n) of said current image ($I_N$) which have been previously coded and then decoded, said method being characterized in that according to the type either spatial, or temporal, of prediction of a current motion vector associated to said partition of the current image, in the case where the geometric shape of either the current partition, or a reference image zone pointed at by the current motion vector, is different from that of k neighbor reference partitions (r'1, r'2, . . . r'k), with k≤n, the method comprises:

determining at least one reference motion vector from a set of k reference motion vectors (MVr'1, MVr'2, . . . ,MVr'k) which are associated respectively with the k neighbor reference partitions;

using said at least one determined reference motion vector to estimate the current motion vector associated with said current image partition, said current motion vector describing the motion between said current image partition and a reference partition belonging to an image different from the current image; and obtaining a predictor of the motion vector as a result of said estimation, said obtained predictor of the motion vector being equal to said at least one selected reference motion vector;

predicting said current motion vector with said at least one selected reference motion vector; and obtaining predicted data as a result of said prediction, said predicted data being equal to said at least one selected reference motion vector.

* * * * *